United States Patent [19]

Garcia et al.

[11] Patent Number: 5,644,583
[45] Date of Patent: Jul. 1, 1997

[54] SOFT ERROR CORRECTION TECHNIQUE AND SYSTEM FOR ODD WEIGHT ROW ERROR CORRECTION CODES

[75] Inventors: Enrique Quique Garcia; Sushama Mahesh Paranjape, both of Tucson, Ariz.

[73] Assignee: International Business Machines Corporation, Armonk, N.Y.

[21] Appl. No.: 479,257

[22] Filed: Jun. 7, 1995

Related U.S. Application Data

[63] Continuation of Ser. No. 950,620, Sep. 22, 1992, abandoned.

[51] Int. Cl.$^6$ .................................................. G11C 29/00
[52] U.S. Cl. .................................................. 371/40.2
[58] Field of Search ............................ 371/40.1, 40.2, 371/37.2, 40.4, 44, 45, 37.3, 37.7

[56] References Cited

U.S. PATENT DOCUMENTS

| | | | |
|---|---|---|---|
| 4,103,823 | 8/1978 | Aichelmann et al. | 235/312 |
| 4,117,458 | 9/1978 | Burghard et al. | 340/146.1 |
| 4,175,692 | 11/1979 | Watanabe | 235/312 |
| 4,296,494 | 10/1981 | Ishikawa et al. | 371/13 |
| 4,562,576 | 12/1985 | Ratcliffe | 371/21.1 |
| 4,723,243 | 2/1988 | Joshi et al. | 371/37.1 |
| 5,003,542 | 3/1991 | Mashiko et al. | 371/40.1 |
| 5,014,273 | 5/1991 | Gagliardo et al. | 371/37.7 |

OTHER PUBLICATIONS

Kaufman, "Fault-Tolerant Memory with Simple Error Correcting Codes", IBM Tech. Disclosure Bulletin, vol. 26, No. 11, Apr. 1984, pp. 6142–6144.

*Primary Examiner*—Hoa T. Nguyen
*Attorney, Agent, or Firm*—Benman, Collins & Sawyer

[57] ABSTRACT

A soft error correction technique and system for an odd weight row error correction code comprising a memory for storing a data word and its associated check bits and a control circuit for reading and inverting the data word and the check bit stored in memory. The system also comprises an inversion circuit for selectively reinverting the check bits. In a specific implementation, the check bit inversion circuit includes a plurality of Exclusive Or gates. A first input of each Exclusive Or gate is connected to receive the check bit from memory and a second input is connected to receive a control bit from a central processing unit via a software accessible control register. The inverted data word and the selectively reinverted check bit are input to an odd weight row error correcting circuit to correct a detected bit error. A method for correcting data errors for an odd weight row error correction system is also provided. The method consists of storing a data word and its associated check bits; reading and inverting the stored data word and check bit; providing a control word; selectively reinverting the stored check bit; and correcting errors in the inverted stored data word using an odd weight row error correction code.

11 Claims, 1 Drawing Sheet

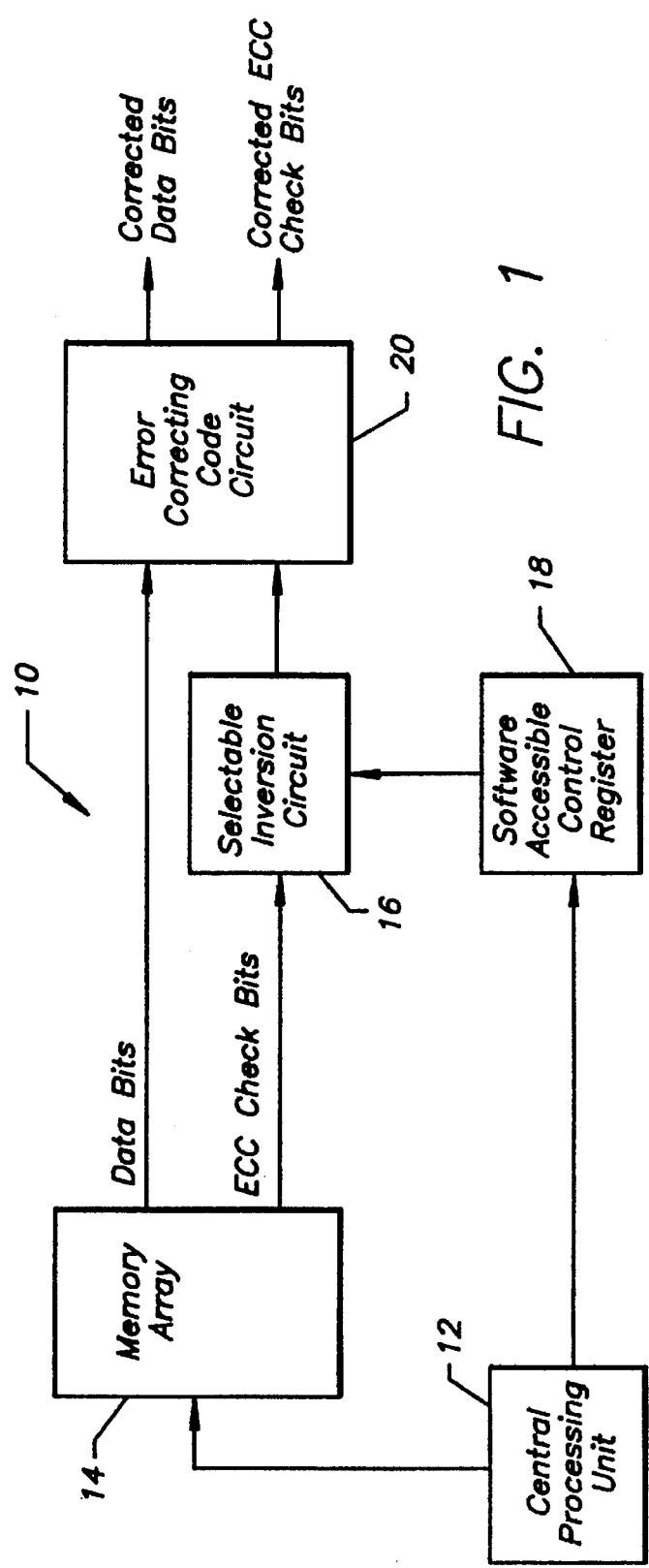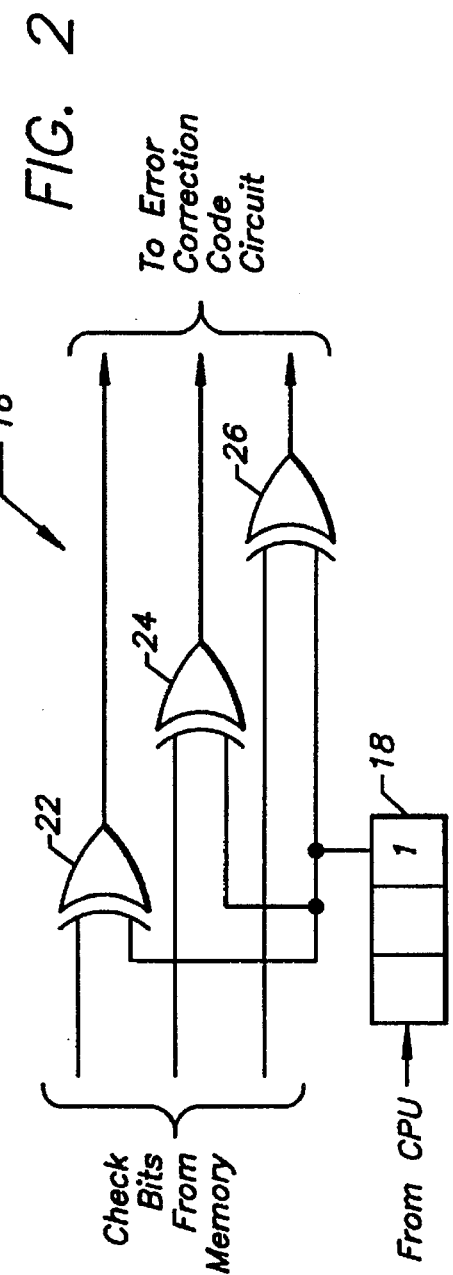

5,644,583

SOFT ERROR CORRECTION TECHNIQUE AND SYSTEM FOR ODD WEIGHT ROW ERROR CORRECTION CODES

This is a continuation of application, Ser. No. 07/950,620, filed Sep. 22, 1992 now abandoned.

BACKGROUND OF THE INVENTION

1. Field of the Invention

The present invention relates to error correcting systems and techniques. More specifically, the present invention relates to systems and techniques for correcting soft (data) errors.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

The memory chips used in digital data processing and communication systems are subject to hard and soft errors. A typical memory chip is an array of data-storage cells. The 64K chip, for example, consists of an array of 256 by 256 data-storage cells. Each cell stores one bit, a 0 or a 1. The 0's and 1's stored in a memory chip are represented by the presence or absence of a charge at cell sites in the array.

A hard error results from a defect in the memory by which a cell becomes fixed in one logical state or the other.

Soft errors occur when a bit of data is stored or read incorrectly from memory. Soft errors are data errors which may result from alpha particles and/or numerous other effects.

Conventional digital error correcting codes (ECC) can be designed to correct "n" errors and detect "n+1" errors. Thus, soft errors may make correctable errors merely detectable or may make detectable errors undetectable.

Hence, "soft-scrub" techniques have been developed to eliminate soft errors. Soft-scrubbing is a technique which may be used with symmetrical error correcting codes. Symmetrical error correcting codes have the property that if all the data and check bits are inverted the result is still a valid code ECC word. Soft scrubbing involves an inhibition of error correction and a reading of raw data and ECC check bits from memory. Next, all the bits are inverted in software and re-written into memory. Error correction is re-enabled and the data and check bits are read again from memory. Next, the bits are re-inverted in software and re-written to memory. The data is then re-read normally. If it is then correctable, there was a soft error and it has been "scrubbed". The corrected word can now be re-written to memory. In this case, the existence of a hard error has allowed a soft error to be corrected.

In any event, the conventional "soft-scrub" technique is effective only for symmetrical or even weight row error correcting codes. Unfortunately, in the development of an error correcting system, the designer typically builds a code to meet system requirements without control over the symmetry of the code. Thus, if the code turns out to be odd or unsymmetrical it is generally difficult if not impossible to change the code from odd to even and still meet the requirements of the system.

Hence, a need remains in the art for a technique for correcting soft errors in odd weight row error correcting codes.

SUMMARY OF THE INVENTION

The need in the art is addressed by the error correction system of the present invention. The inventive system includes a memory for storing a word of digital data and at least one check bit for same, a control circuit for reading and inverting the data word in memory and an inversion circuit for selectively inverting the check bit associated with the data word.

In a specific implementation, the check bit inversion circuit is implemented with a plurality of Exclusive Or gates. A first input of each Exclusive Or gate is connected to receive the check bit from memory and a second input of each Exclusive Or gate is connected to receive a control bit. The control bit is provided from a central processing unit via a software accessible control register. The data word and the selectively inverted check bit are input to an odd weight row error correcting circuit.

By providing for selective inversion of the check bit, the present invention provides a technique for correcting soft errors in odd weight row error correcting codes.

BRIEF DESCRIPTION OF THE DRAWINGS

FIG. 1 is a block diagram of the soft error correction system of the present invention for odd weight row error correction codes.

FIG. 2 is a block diagram showing an illustrative implementation of the selectable inversion circuit with the software accessible control register of the soft error correction system of the present invention.

DESCRIPTION OF THE INVENTION

Illustrative embodiments and exemplary applications will now be described with reference to the accompanying drawings to disclose the advantageous teachings of the present invention.

FIG. 1 is a block diagram of the soft error correction system of the present invention for odd weight row error correction codes. The system 10 includes a central processing unit 12, a memory array 14, a selectable inversion circuit 16, a software accessible control register 18 and an odd weight row error correcting code circuit 20. The memory array stores multiple words of digital data along with error correcting code check bits associated therewith. In accordance with the present teachings, the check bits are selectively inverted by the selectable inversion circuit 16 and input to the odd weight row error correcting circuit 20 along with the data word from memory 14. The selectable inversion circuit 16 operates under control of the central processing unit 12 via the software accessible control register 18.

FIG. 2 is a block diagram showing an illustrative implementation of the selectable inversion circuit 16 with the software accessible control register 18 of the soft error correction system of the present invention. In the illustrative implementation, the selectable inversion circuit 16 is implemented with three Exclusive Or (XOR) gates 22, 24 and 26. In practice, the number of XOR gates will be equal to the number of check bits used in the error correcting scheme (e.g. 16). A first input to each XOR gate is provided by the check bit output by the memory 14 for a given data word. The second input to each XOR gate is a control input provided by the register 18. Data written to the register 18 by the central processing unit controls the inversion of the check bits by the XOR gates 22, 24 and 26. That is, in accordance with the XOR truth table, when the control input is high, the XOR gate acts as an inverter. When the control input is low, the output of the XOR gate follows the check bit input. Thus, the check bits may be selected to be inverted or non-inverted when presented to the error correcting code circuit.

The operation of the present invention is best illustrated by first reviewing the operation of a conventional 'soft-scrub' error correction system operating on an even weight code data word.

TABLE I

| Bit # | 0 | 1 | 2 | 3 | 4 |
|---|---|---|---|---|---|
| bit type | data ↓ | data ↓ | hard ↓ | soft ↓ | check bit ↓ |
| Step # | | | | | |
| 0. | 0 | 1 | 1 | 0 | 0 |
| 1. | 0 | 1 | 0 | 1 | 0 |
| 2. | 1 | 0 | 1 | 0 | 1 |
| 3. | 1 | 0 | 0 | 0 | 1 |
| 4. | 1 | 0 | 0 | 1 | 1 |
| 5. | 0 | 1 | 1 | 0 | 0 |

At step 0, the original data word without shown. At step 1, the word is read from memory with one hard error at bit number 2 and one soft error at bit number 3. At step 2, the word value is shown after software inversion. At step 3, the word value in memory is shown after rewrite. Note that the hard error reappeared in bit number 2. This re-written word is now re-read using error correction circuitry and shown at step 4. Thus, at step 5, after another inversion, the correct data word appears. Note that the soft error is now corrected. Although the hard error will reappear when the word is re-written to memory, since the total number of errors is reduced by one error, the error correction circuit can now correct for the lone hard error on re-read.

Unfortunately, this "soft-scrub" technique has heretofore been limited to even-weight row error correcting schemes.

A particularly novel and advantageous aspect of the present invention is the utility of same in connection with the soft-scrubbing of odd weight coded words. The advantageous operation of the present invention is illustrated with respect to Table II below.

TABLE II

| Bit # | 0 | 1 | 2 | 3 | 4 |
|---|---|---|---|---|---|
| bit type | data ↓ | data ↓ | hard ↓ | soft ↓ | check bit ↓ |
| Step # | | | | | |
| 0. | 0 | 1 | 1 | 0 | 0 |
| 1. | 0 | 1 | 0 | 1 | 0 |
| 2. | 1 | 0 | 1 | 0 | 1 |
| 3. | 1 | 0 | 0 | 0 | 1 |
| 4. | 1 | 0 | 0 | 0 | 1 |
| 5. | 1 | 0 | 0 | 0 | 0 |
| 6. | 1 | 0 | 0 | 1 | 0 |
| 7. | 0 | 1 | 1 | 0 | 0 |

Steps 0–3 remain the same as with the conventional soft-scrub technique discussed above. That is, data in memory is read by the central processing unit inverted and re-written to memory. However, in accordance with the present teachings, at step 4, the word is re-read and at step 5, the inverted check bit is inverted by the selectable inversion circuit 16 under the control of the central processing unit 12 via the software accessible register 18 as discussed above. This allows the technique of the present invention to be used with odd weight row error correction codes. Next, the data word (bits 0–3) and the inverted check bit (bit 4) are processed by the odd weight code error correction circuit 20. The result is shown at step 6. Next, the corrected data word bits or are re-inverted in software. The check bit is not re-inverted. Note that the soft error has once again be an repaired but, this time, with a soft-scrub error correction scheme that is effective with odd weight row error correction codes. In the illustrative embodiment, the error correction code circuit 20 includes logic circuits (e.g., ANDs, ORs, XORs, and inverters) which perform a Reed-Solomon odd weight row error correction algorithm on the re-inverted data bit and selectively inverted check bit.

Thus, the present invention has been described herein with reference to a particular embodiment for a particular application. Those having ordinary skill in the art and access to the present teachings will recognize additional modifications, applications and embodiments within the scope thereof. For example,the invention is not limited to the implementation shown for controlling the selective inversion of the check bits. Nor is the invention limited to any particular error correcting technique.

It is therefore intended by the appended claims to cover any and all such applications, modifications and embodiments within the scope of the present invention.

Accordingly,

What is claimed is:

1. An error correction system comprising:
   memory means for storing a word of digital data and at least one check bit;
   control means for reading and inverting said data word and said check bit in said memory means;
   inversion means responsive to said control means for selectively reinverting said check bit; and
   means responsive to said reinverted check bit for correcting a bit error in said data word.

2. The invention of claim 1 wherein said inversion means includes an Exclusive Or gate for selectively reinverting said check bit.

3. The invention of claim 2 wherein said memory means provides a check bit as a first input to said Exclusive Or gate.

4. The invention of claim 3 wherein said control means further provides a control bit as a second input to said Exclusive Or gate.

5. The invention of claim 4 wherein said control means includes a software accessible control register for providing said control bit.

6. The invention of claim 5 wherein said control means includes means for providing a control word to said software accessible control register for generating said control bit.

7. The invention of claim 6 wherein said control means includes means for reading from and writing to said memory means.

8. The invention of claim 1 wherein said means responsive to said reinverted check bit for correcting said bit error in said data word includes an error correcting code means.

9. The invention of claim 8 wherein said error correcting code means includes an odd weight row error correcting code circuit.

10. A method of correcting data errors including the steps of:

provideing a word of digital data and at least one check bit;

reading and inverting said data word and said check bit;

selectively reinverting said inverted check bit; and correcting errors in said data word in accordance with said selectively reinverted check bit.

11. A method of correcting data errors for an odd weight row error correction system including the steps of:

providing a word of digital data and at least one check bit;

reading and inverting said data word and said check bit;

providing a control word;

selectively reinverting said inverted check bit in accordance with said control word; and correcting errors in said data word in accordance with said selectively reinverted check bit using an odd weight row error correction code.

* * * * *

UNITED STATES PATENT AND TRADEMARK OFFICE
CERTIFICATE OF CORRECTION

PATENT NO. : 5,644,583
DATED : Jul. 1, 1997
INVENTOR(S) : Garcia et al.

It is certified that error appears in the above-indentified patent and that said Letters Patent is hereby corrected as shown below:

At column 4, line 4, after "the", please delete--inverted--;
            line 12, delete "or" insert --only--
            line 14, please change "be an" to --been--.

Signed and Sealed this

Twenty-first Day of April, 1998

Attest:

BRUCE LEHMAN

*Attesting Officer*      *Commissioner of Patents and Trademarks*